July 5, 1966 J. ROSÁN ETAL 3,259,163
FASTENER WITH SNAP-ON CAPTIVE LOCKING RING
Filed Sept. 16, 1964 4 Sheets-Sheet 1

INVENTORS
José Rosán
BY MARVIN REECE
ATTORNEY

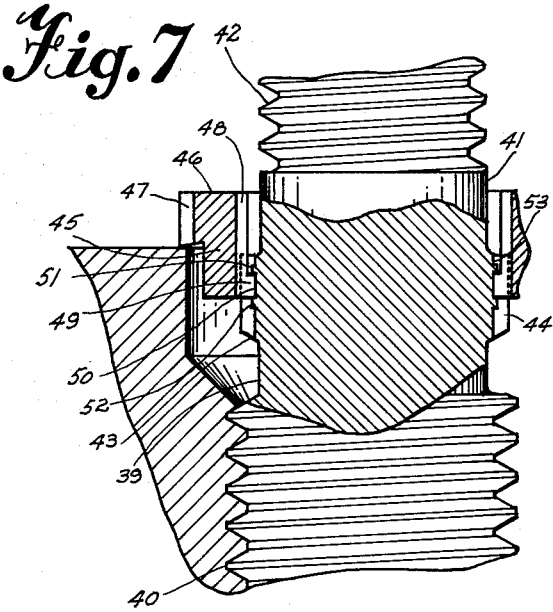
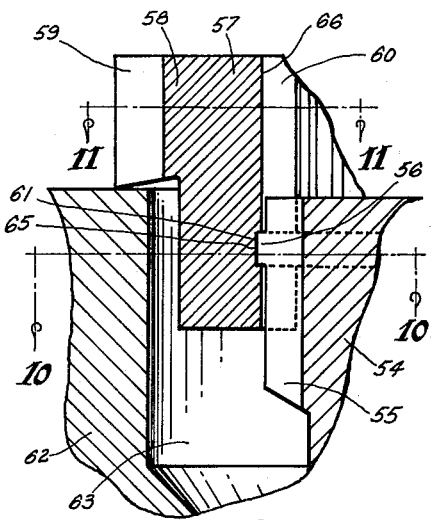
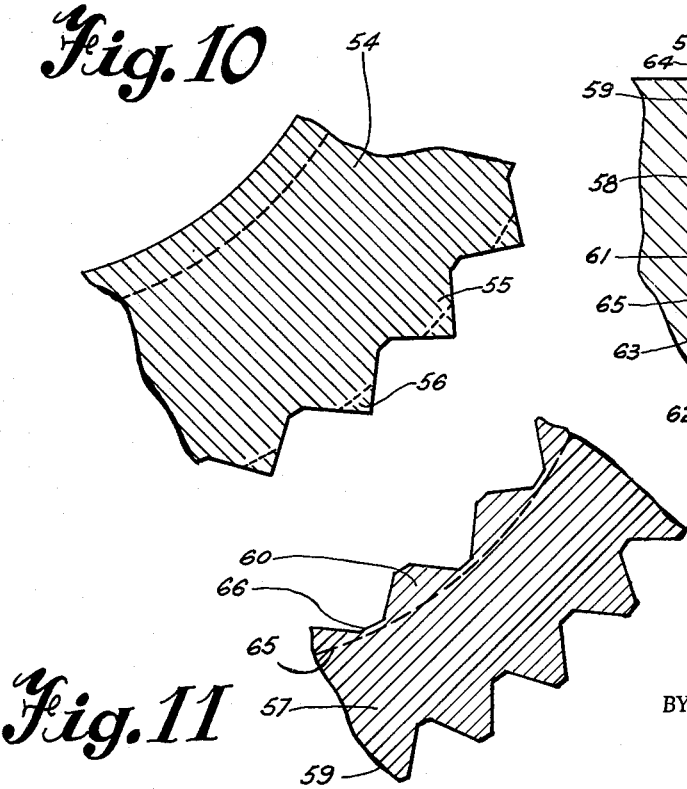
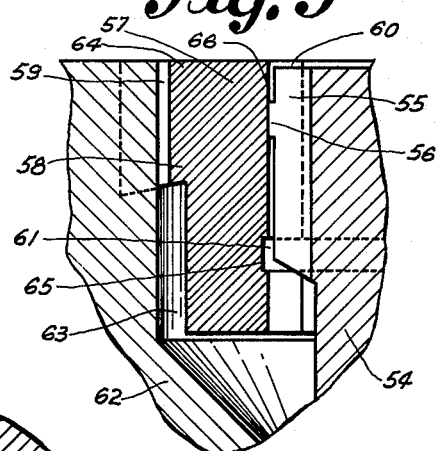
INVENTORS
José Rosán
MARVIN REECE
BY
ATTORNEY July 5, 1966   J. ROSÁN ETAL   3,259,163
FASTENER WITH SNAP-ON CAPTIVE LOCKING RING
Filed Sept. 16, 1964   4 Sheets-Sheet 3

INVENTORS
José Rosán
Marvin Reece
BY
ATTORNEY

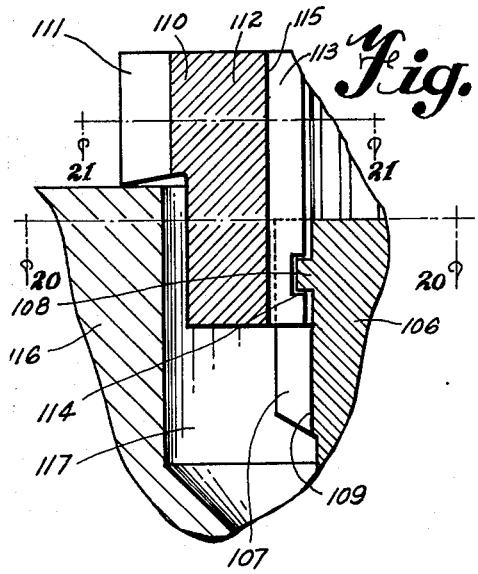
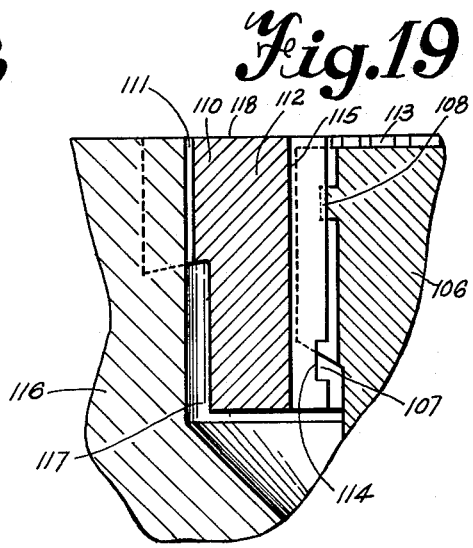
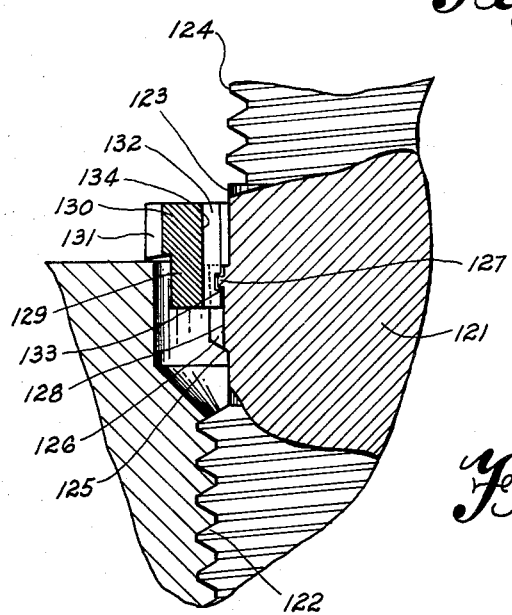
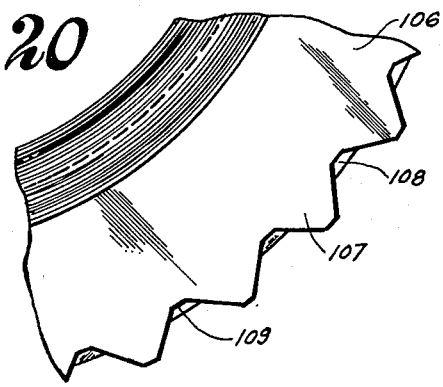
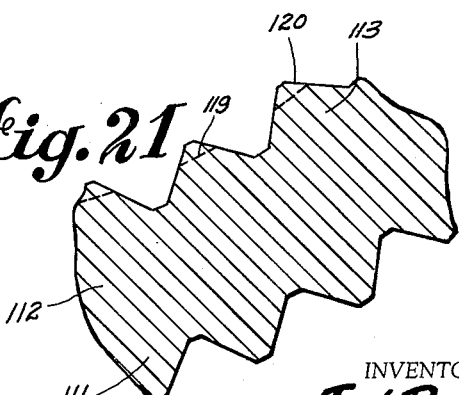
INVENTORS
José Rosán
MARVIN REECE
BY
Roman A. Dihm
ATTORNEY 3,259,163
**FASTENER WITH SNAP-ON CAPTIVE
LOCKING RING**
José Rosán, San Juan Capistrano, and Marvin P. Reece,
Dana Point, Calif., assignors to Rosan Engineering
Corp., Newport Beach, Calif., a corporation of California
Filed Sept. 16, 1964, Ser. No. 396,867
9 Claims. (Cl. 151—41.73)

This invention relates to improvements in fasteners designed for installation in bores of relatively softer material and to a method of making same. More particularly, the invention concerns a fastener which includes a cylindrical body having a nondisengageable locking ring rigidly attached thereto but adapted to be axially displaced in a predetermined manner so as to lock said body against rotation relative to a workpiece, and with a method of making such a fastener.

Heretofore, fasteners with locking rings have generally been characterized by the fact that the fastener body and locking ring are supplied and installed as separate components. The fastener body of the conventional fastener is then normally installed in threaded engagement with a corresponding threaded bore of a workpiece, and a separate ring is then aligned with the fastener body and driven into a counterbore at one end of said bore to lock the fastener body against rotation in the bore. Because the locking rings and fastener bodies are provided as separate components, the stocking, assembly and installation of the separate components are expensive, time consuming and laborious tasks which materially increase the cost incident to the utilization of such fasteners.

Having the fastener bodies and locking rings as separate components has other important disadvantages in that great care is necessary to insure that the locking ring is properly aligned with the fastener body and simultaneously properly aligned with the bore in the workpiece.

The present invention comprises a fastener having a head and an externally threaded cylindrical body. The periphery of the head is provided with a plurality of longitudinal serrations which have spaced webs in the roots thereof. The serrated head is engaged by a locking ring which is provided with internal serrations adapted to engage the serrations carried by the head. The locking ring is also provided with a plurality of external serrations on its outer periphery.

The external serrations carried by the locking ring are embedded into the surface of the workpiece material surrounding the counterbore upon the application of an axial force thereon, thereby prohibiting rotation of the locking ring relative to said workpiece. Because of the engagement of the internal serrations carried by the locking ring with the external longitudinal serrations provided by the fastener head, the fastener body is likewise prohibited from rotation relative to the workpiece.

The internal serrations carried by the locking ring are provided with inwardly extending projections, which are adapted to be accommodated in cavities formed between the spaced webs located in the roots of the serrations provided by the head of the fasteners. When the aforesaid projections are snapped into position in the cavities between the root webs, the coaction of the resilience of the material of the locking ring and the nestling of the projections in the cavities, rigidly secures the locking ring to the serrated head of the fastener. Simultaneously, the internal serrations of the locking ring are in interengaged alignment with the external serrations carried by the serrated fastener head. Thus, the locking ring of the fastener is rigidly and integrally maintained in a prealigned and predetermined position relative to the fastener body and the bore of the workpiece into which the fastener is to be installed. Consequently, when a downward axial force is applied to the locking ring, the projections carried by the internal serrations of the locking ring are snapped out of engagement with the webs in the roots of the external serrations of the fastener head, and the ring is thereby axially displaced in a predetermined manner.

Further, when an axial force is applied upon the locking ring so as to embed the ring into the workpiece, it should be noted that the axial displacement of the locking ring is independent of the body of the fastener. That is, the body remains stationary and undisturbed while the locking ring is being driven into locking position. Thus, the possibility of damage or distortion of the external threads of the fastener or the threads of the bore in the parent material is eliminated.

The principles of this invention are further illustrated in another configuration of the fastener. In the alternate configuration, the contour of the external peripheral serrations carried by the fastener head is truncated with the exception of a portion thereof so as to provide an outwardly extending projection on each serration. In addition to internal serrations, the locking ring is provided with an internal annular cavity or groove which is adapted to accommodate the projections carried by the serrations of the fastener head. The maximum radial diameter of the groove is greater than the maximum diameter of the arcuate plane of the roots of the internal serrations so that the groove extends radially outwardly of said roots. The installation and use of the alternate configuration is similar to that of the fastener previously described herein.

In yet another embodiment of a fastener illustrating the principles of the present invention, the internal serrations of the locking ring are truncated so that each serration is provided with an outwardly extending projection. The head of the fastener body which is provided with external longitudinal serrations is also provided with an external annular groove or cavity. The radial diameter of this annular groove is less than the radial diameter of an arcuate plane passing through the roots of the serrations so that the radial depth of the groove is greater than the radial height of the serrations. The elements, installation and use of this embodiment are in all other respects the same as the other embodiments of the invention as hereinbefore described.

The principles of the present invention are further illustrated in another embodiment of a fastener wherein the external serrations carried by the head of the fastener body are provided with a radial web positioned in the roots thereof. The locking ring is provided with an internal annular groove or cavity superimposed upon the internal serrations thereof so that the radial diameter of the groove is less than the radial diameter of the roots of the internal serrations. The annular groove of the locking ring is adapted to receive and tightly accommodate the web contained in the roots of the head serrations of the fastener body. In all other respects, this embodiment is similar to the other embodiments of the invention previously described herein.

Thus, an important feature of the present invention is that a self-contained unit is provided consisting of a fastener body and a locking ring temporarily rigidly attached to said body, said ring being simultaneously prealigned with the fastener body and the bore of the workpiece.

Accordingly, the principal object of the invention is to provide an improved, simple, self-contained fastener of inexpensive construction having a locking ring in simultaneous prealigned relationship with the fastener body and workpiece bore, and capable of being installed and locked into place by extremely inexpensive tools.

Another object of the invention is to provide a fastener capable of having the fastener body stationary and undisturbed while the locking ring thereof is embedded into locking position so as to prevent damage or distortion to the external threads of the fastener and to the threads of the bore in the workpiece.

A further object is to provide a special insert type fastener.

A still further object is to provide a special fastener embodying a stud.

Another object of the invention is to provide a method for making a self-contained, nondisengageable, lockable fastener.

Still another object of the invention is to provide a method for making a prealigned, nondisengageable, lockable fastener.

Other objects and advantages of the invention will become apparent from the following description taken in conjunction with the accompanying drawings, in which:

FIG. 7 is an enlarged elevational view, partly sectioned, of a stud fastener embodying the principles of the present invention showing the stud with a locking ring of the type illustrated in FIGS. 1–5;

FIG. 8 is a greatly enlarged, fragmentary, sectional view illustrating another embodiment of the invention showing the locking ring prior to the axial displacement thereof into its locking position;

FIG. 9 illustrates the embodiment of FIG. 8 having the locking ring thereof axially displaced into locking engagement with the workpiece;

FIG. 10 is a greatly enlarged, fragmentary view of the serrated head of the fastener taken on line 10—10 of FIG. 8;

FIG. 11 is a greatly enlarged, fragmentary view of the locking ring taken on the line 11—11 of FIG. 8;

FIG. 18 is a greatly enlarged, fragmentary, sectional view illustrating still another embodiment of the invention showing the locking ring prior to the axial displacement thereof into its locking position;

FIG. 19 shows the embodiment of FIG. 18 having the locking ring thereof axially displaced into locking engagement with the workpiece;

FIG. 20 is a greatly enlarged, top plan view of the serrated head of the fastener of FIG. 19 taken on line 20—20 thereof;

FIG. 21 is a greatly enlarged, fragmentary view of the locking ring taken on line 21—21 of FIG. 18; and FIG. 22 is an enlarged, elevational view, partly sectioned, of a stud fastener embodying the principles of the present invention showing the stud with a locking ring of the type illustrated in FIG. 18 prior to the axial displacement thereof into its locking position.

Figure 1:
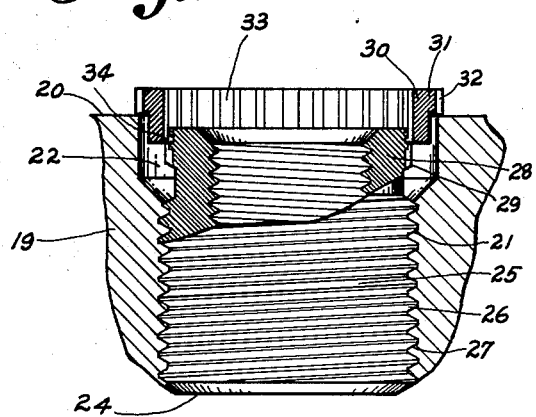
FIG. 1 is an enlarged, elevational view, partly sectional, of an insert fastener of the present invention, showing the fastener fully threaded prior to locking same into a bore of a workpiece.

Referring more particularly to FIG. 1, numeral 19 designates generally a workpiece having an outer surface 20. As illustrated, the workpiece 19 is formed with a threaded bore 21 extending inwardly from the outer surface 20 and an enlarged cylindrical counterbore 22, extending inwardly from workpiece surface 20 to a predetermined depth.

The fastener is constructed of any suitable material relatively harder than the workpiece 19 and is generally identified by the numeral 24, said fastener comprising cylindrical body 25 provided with external threads 26 and a threaded bore 27. In FIG. 1 the fastener body 25 is shown threaded into bore 21 of workpiece 19.

The fastener body 25 has an integral head 28 and longitudinal serrations 29. Fastener 24 is further provided with a locking ring which is generally designated by numeral 30. Locking ring 30 has an outwardly projecting radial flange 31 which is provided with external serrations 32. Locking ring 30 is also provided with a plurality of internal longitudinal serrations 33 having inwardly extending projections 34.

The serrations 29 of head 28 are provided with retainer cavities 35 formed by spaced radial webs 36 and 37 (best shown in FIGS. 2-4) positioned in the serration roots 38. The depth and width of web cavities 35 are slightly greater than the radial length and height, respectively, of projections 34 carried by locking ring 30.

When locking ring 30 is placed into its first inoperative position so that projections 34 are nested in cavities 35, projections 34 are snugly accommodated in said cavities. Thus, the coaction of the resilience of the locking ring material and the snug internesting of projections 34 in cavities 35 maintain locking ring 30 in tight association with the serrations 29 of head 28. Webs 36 and 37 are slightly contoured so as to facilitate the passing of projections 34 thereover upon the application of an axial force to locking ring 30. As illustrated in FIG. 1, the locking ring 30 is seated on surface 20 of workpiece 19 prior to being axially displaced into counterbore 22 of the workpiece material 19.

The axial movement of locking ring 30 is restricted by the engagement of the serration projections 34 by the root webs 36 and 37 when the locking ring is in the position shown in FIG. 1. The coaction of root web 36 with the serration projections 34 thus prevents axial disengagement of the locking ring from the fastener body. The engagement of the serration projections 34 with longitudinal serrations 29 of fastener body 25 permits only axial movement of the locking ring with respect to the fastener body. Thus, not only is the locking ring in captive association with the fastener body so as to provide a self-contained unit, but the locking ring is also simultaneously maintained in preset alignment with the fastener body and the workpiece counterbore, thereby facilitating the installation of the fastener unit.

Figure 2:
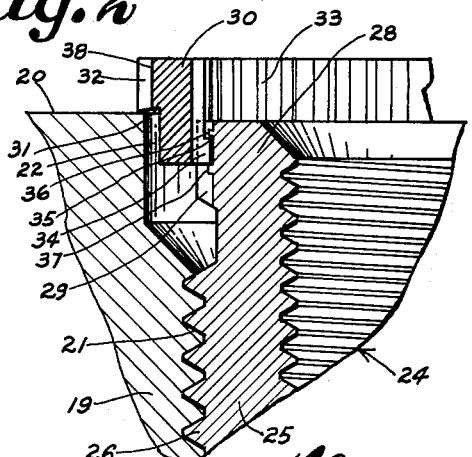
FIG. 2 is a greatly enlarged, fragmentary, sectional view of the fastener illustrated in FIG. 1, showing the locking ring prior to axial displacement thereof into its locking position.

FIG. 2 is a greatly enlarged view of FIG. 1 showing the relative association of the features of the locking ring 30 with the head portion 28 of the fastener 24.

Figure 3:
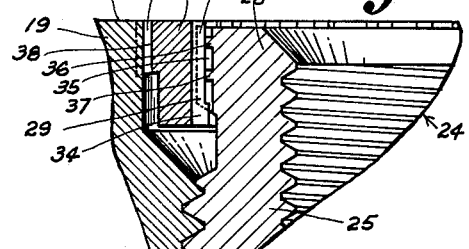
FIG. 3 is a greatly enlarged, fragmentary, sectional view of the fastener illustrated in FIGS. 1 and 2, showing the locking ring after axial displacement thereof into its locked position.

In FIG. 3, the fastener 24 of FIG. 1 is shown fully installed in workpiece 19. The fastener body 25 is threaded in bore 21 of workpiece 19 and locking ring 30 has been longitudinally displaced by the application of an axial force thereon which can be provided by a tool or the like adapted therefor. By application of the aforesaid axial force, external flange serrations 32 are thereby embedded in surface 20 of workpiece 19, and the inwardly extending projections 34 carried by the locking ring 30 are simultaneously displaced in a longitudinal direction being guided in said direction by the engagement of said projections 34 with the serrations 29 (shown in dashed lines) carried by the fastener head.

When external flange serrations 32 are embedded into surface 20 of workpiece 19, the workpiece material is accommodated into the voids between said serrations 32 thereby prohibiting rotational movement of locking ring 30 relative to the bore 21 of workpiece 19. In addition, the workpiece material thus accommodated is "cold-worked" and hardened, thereby creating greater resistance to subsequent torque force.

The engagement of projections 34 with serrations 29 of head 28 also prohibits rotation of body 25 relative to locking ring 30 and workpiece 19. Thus, the threaded connection of the fastener body 25 with threaded bore 21 of the workpiece, and the engagement of the internal longitudinal serrations 33 of locking ring 30 with the external serrations 29 of the fastener head 28, coact in conjunction with the simultaneous embedding of the external flange serrations 32 of locking ring 30 into the workpiece surface to provide a fastener securely locked in a workpiece against rotational and axial displacement.

Figure 4:
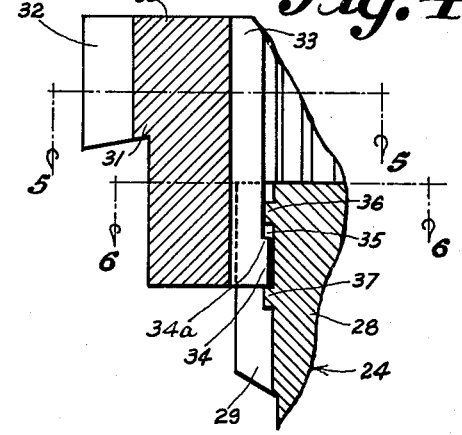
FIG. 4 is a greatly enlarged, fragmentary, sectional view showing the detail of the locking ring prior to axial displacement thereof into its locking position.

The locking ring of FIGS. 1-3 is more clearly illustrated in FIG. 4. The locking ring 30 is provided with an outwardly projecting flange 31 having serrations 32. The locking ring is further provided with internal serrations 33 having inwardly extending projections 34 forming step shoulder 34a. As hereinabove described, the flange serrations 32 and the internal serrations 33 coact with the workpiece material and the fastener body, respectively, to lock the fastener into the workpiece bore against subsequent rotational movement.

Figure 5:
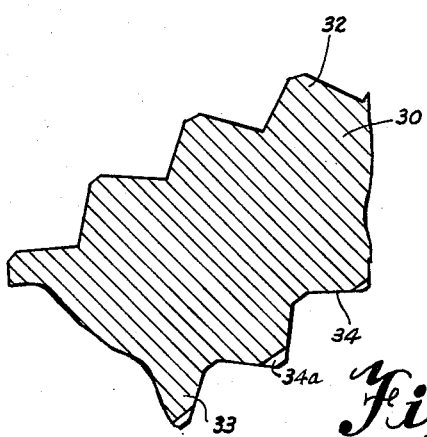
FIG. 5 is a greatly enlarged, fragmentary view of the locking ring taken on line 5—5 of FIG. 4.

The enlarged plan view of the locking ring 30 shown in FIG. 5 illustrates the relationship of the internal serrations 33 and the extending projections 34.

It should be noted that the inwardly extending projections 34 carried by locking ring 30 are substantially fully contoured serrations, whereas internal serrations 33 are truncated and longitudinally superimposed on projections 34, thereby forming a step shoulder 34a. Consequently, the roots and side walls of the projections 34 lie in the same plane as those of serrations 33.

Figure 6:
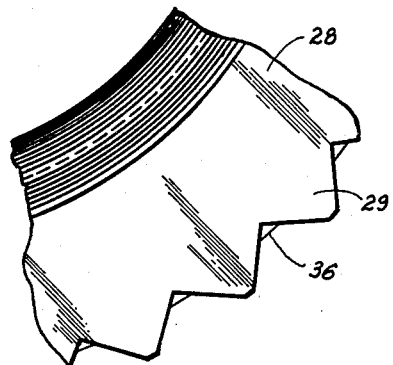
FIG. 6 is a greatly enlarged, fragmentary, top plan view of the fastener taken on the line 6—6 of FIG. 4 (the locking ring not shown)

In FIG. 6, the enlarged top plan view of the fastener head 28 clearly shows the root web 36 located in the roots 38 of head serrations 29. The internal extending projections 34 are nested in the retainer cavity formed by web 36 and corresponding web 37 spaced therefrom within the roots 38 of the serrations 29 prior to the axial displacement of the locking ring 30 into its locked position, as illustrated in FIG. 3.

FIG. 7 is an illustration of a stud type fastener embodying the principles of the invention in which the fastener body, designated generally by the numeral 39, is solid rather than tubular, and is provided with threads 40 and an integral longitudinally projecting shank 41. Shank 41 is provided with threads 42. The features associated with this embodiment are in all respects similar to those associated with the fastener of FIGS. 1-6. The fastener body 39 is provided with an integral radial flange 43 having longitudinal peripheral serrations 44. Locking ring 45 is provided with an external radial flange 46 having external peripheral serrations 47. Locking ring 45 is also provided with a plurality of internal longitudinal serrations 48 having inwardly extending projections 49. As was the case with the fastener of FIGS. 1-6, serrations 44 of body 39 are provided with retainer cavities 50 formed by spaced radial webs 51 and 52 positioned in the serration roots 53. The depth and width of web cavities 50 are slightly greater than the radial length and height, respectively, of the inwardly extending projections 49 carried by locking ring 45. Inwardly extending projections 49 of locking ring 45 of the type hereinabove described in FIGS. 1-6, engage the longitudinal serrations 44 of said fastener. Said locking ring is thus prevented from axial disengagement from body 39 by the coaction of inwardly extending projections 49 with web 51 of serrations 44.

FIG. 8 illustrates another embodiment of the invention in which the fastener body (not shown) has a head 54 which is provided with longitudinal peripheral serrations 55. Serrations 55 are not fully contoured, but are truncated so as to provide outwardly extending projections 56. A flange 58, which has a plurality of external serrations 59 around the periphery thereof, is carried by locking ring 57. Locking ring 57 is further provided with internal serrations 60 which are engageable with serrations 55 of head 54. The internal periphery of the locking ring is provided with an annular groove 61 which has a radial diameter slightly greater than the radial diameter of the roots 66 of internal serrations 60 carried by locking ring 57. The width and depth of annular groove 61 are slightly greater than the height and radial length of projections 56, respectively, so that the projections are snugly accommodated in groove 61. Thus, by virtue of the resilience of the material of the locking ring coacting with the nesting of projections 56 in annular groove 61, the locking ring 57 is maintained in tight association with head 54 in a prealigned and predetermined position with respect to the fastener body and the counterbore 63 in the workpiece 62. As illustrated, the locking ring in FIG. 8 is in its inoperative or unlocked position having serrations 59 thereof seated on the surface of workpiece 62 with a portion of the body of the locking ring 57 accommodated within counterbore 63.

In FIG. 9, locking ring 57 if FIG. 8 is shown axially displaced into its operative or fully locked position. Upon the application of an axial force on surface 64 of locking ring 57, groove 61 is disengaged from projection 56. Simultaneously, the serrations 59 are embedded into the surface of workpiece 62. The workpiece material contained in the crevices between the serrations 59 will prevent rotational movement of the locking ring 57 with respect to the workpiece material. Since internal serrations 60 of locking ring 57 are also engaged with serrations 55 of head 54 of the fastener body, the fastener body is also prevented from rotational movement with respect to the bore of workpiece 62.

FIG. 10 is a sectional view of head 54 of the fastener body taken on line 10—10 of FIG. 8 and illustrates the truncated configuration of the serrations (in dashed lines) in relationship to the projections 56 carried thereby.

FIG. 11 is a sectional view of ring 57 taken on line 11—11 of FIG. 8 which clearly shows the relationship of the annular groove 61 to the internal serrations 60. As illustrated, the radial depth of the groove is defined by wall 65 thereof (shown in dashed lines) and the arcuate plane passing through the roots of serrations 60.

Figure 12:
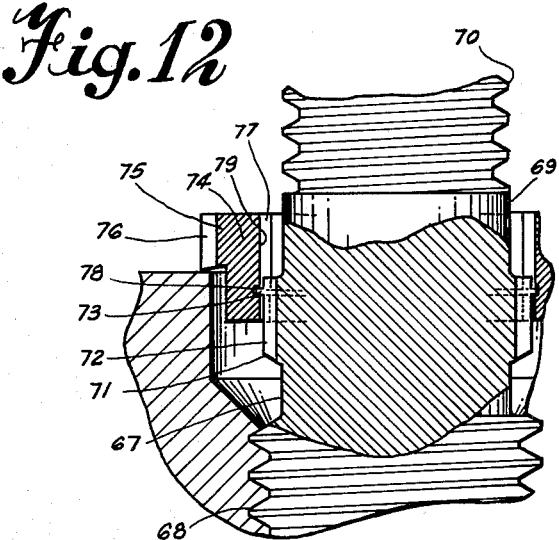
FIG. 12 is an enlarged elevational view, partly sectioned, of a stud fastener embodying the principles of the present invention showing the stud with a locking ring of the type illustrated in FIG. 8.

FIG. 12 is an illustration of a stud type fastener embodying the principles of the invention illustrated in FIGS. 8-11. The fastener body, generally designated by the numeral 67, is solid and is provided with threads 68 and an integral longitudinally extending shank 69 having threads 70 thereon. The body 67 is provided with an annular flange 71 which has longitudinally extending external serrations 72 around the periphery thereof. Serrations 72 do not have a full configuration but are truncated so as to provide outwardly extending projections 73, as was the case in the embodiment of FIGS. 8-11. Locking ring 74 has a flange 75 which is provided with external peripheral serrations 76. The locking ring is also provided with internal serrations 77 and an internal annular groove 78. The annular groove 78 has a radial diameter slightly greater than the radial diameter of the roots 79 of internal serrations 77. The width and depth of annular groove 78 are slightly greater than the height and radial length of projections 73, respectively.

As was the case in the embodiment of FIGS. 8-11, the resilience of the material of the locking ring 74, coacting with the projection 73 accommodated in annular groove 78, maintain the locking ring in tight association with flange 71 in a a prealigned and predetermined position with respect to body 67 and the counterbore in the workpiece (not shown) in which the fastener would be threaded. As illustrated, the locking ring is in an inoperative or unlocked position prior to axial displacement thereof into its locked or operative position.

Figure 13:
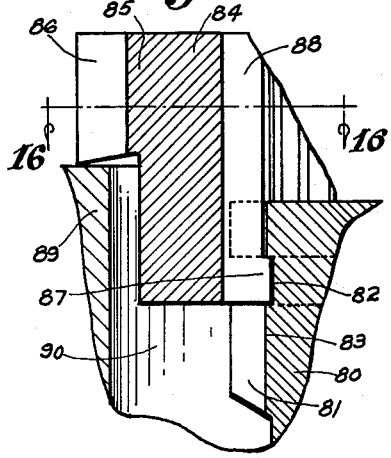
FIG. 13 is a greatly enlarged, fragmentary, sectional view illustrating still another embodiment of the invention showing the locking ring prior to the axial displacement thereof into its locking position.

FIG. 13 illustrates still another embodiment of the invention in which the fastener body (not shown) has a head 80 which is provided with longitudinal peripheral serrations 81 and an annular groove 82 superimposed upon serrations 81. Annular groove 82 has a radial diameter less than the radial diameter of an arcuate plane passing through roots 83 of serrations 81. The locking ring 84 has a radial flange 85 provided with peripheral serrations 86, and is shown rigidly secured to head 80 by means of internal radial projections 87 which are accommodated in annular groove 82 carried by head 80. Internal longitudinal serrations 88 carried by locking ring 84 do not have a full configuration, but are truncated so as to provide projections 87. The width and radial depth of annular groove 82 are slightly greater than the height and radial length of projections 87, respectively, so that the projections are snugly accommodated in groove 82. In FIG. 13, locking ring 84 is shown in its inoperative or unlocked position prior to its axial displacement into its locked position. As illustrated, locking ring 84 is shown accommodated within the counterbore 90 of the workpiece bore (not shown) so that the peripheral flange serrations 86 are seated upon the surface of the workpiece 89.

Figure 14:
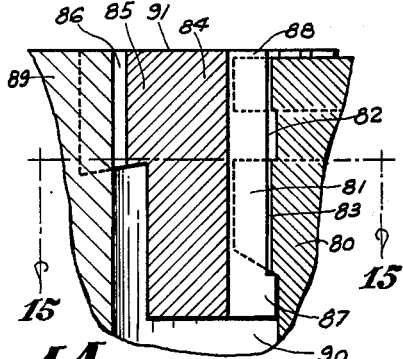
FIG. 14 shows the embodiment of FIG. 13 having the locking ring thereof axially displaced into locking engagement with the workpiece.

FIG. 14 illustrates the embodiment of the invention of FIG. 13, wherein locking ring 84 is axially displaced into the counterbore 90 of the workpiece bore relative to the fastener head 80 so that serrations 86 of said ring are embedded into the workpiece material upon the application of an axial force on surface 91 of said locking ring 84. Simultaneously, projections 87 are disengaged from annular groove 82. The workpiece material in the crevices between serrations 86 of locking ring 84 prevent rotational movement of the locking ring relative to head 80. The interengagement of internal serrations 88 of the locking ring and serrations 81 of the head 80 also prohibits rotational movement of the head relative to the workpiece material 89.

Figure 15:
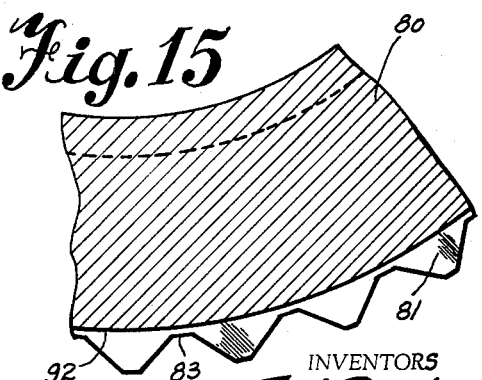
FIG. 15 is a greatly enlarged, fragmentary view of the serrated head of the fastener taken on line 15—15 of FIG. 14.

FIG. 15 is a sectional view of only the head 80 of the fastener body taken on line 15—15 of FIG. 14 showing the relationship of the annular groove 82 having a maximum radial diameter defined by wall 92 thereof. As hereinbefore described, the maximum radial diameter of groove 82 is less than the minimum diameter of an arcuate plane passing through the roots 83 of serrations 81.

Figure 16:
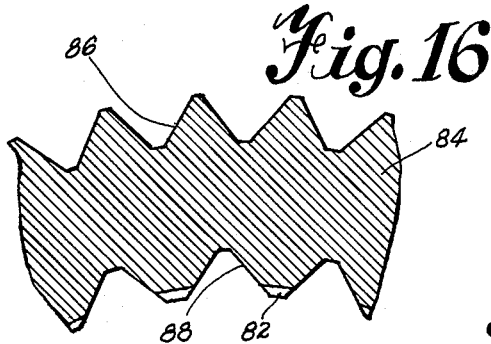
FIG. 16 is a greatly enlarged, fragmentary view of the locking ring taken on line 16—16 of FIG. 13.

FIG. 16 is a sectional view of locking ring 84 taken on line 16—16 of FIG. 13 which clearly shows the truncated configuration of serrations 88 of the locking ring 84 and ahe relationship of projections 82 extending therefrom.

Figure 17:
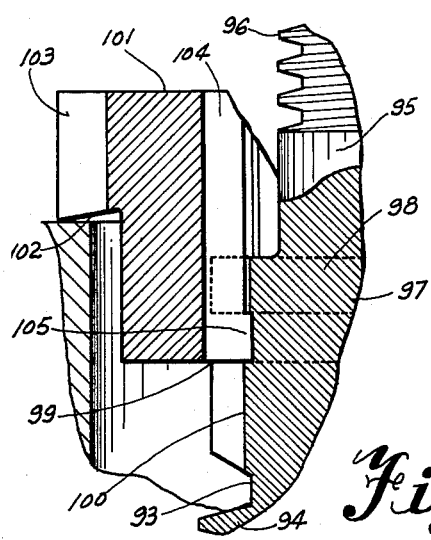
FIG. 17 is an enlarged, elevational view, partly sectioned, of a stud fastener embodying the principles of the present invention showing the stud with a locking ring of the type illustrated in FIG. 13 prior to the axial displacement thereof into its locking position.

FIG. 17 shows a stud type fastener embodying the principles of the invention illustrated in FIGS. 13-16, wherein the fastener body 93 is solid and is provided with external threads 94, and an integral longitudinally extending projecting shank 95 which carries threads 96. Body 93 is provided with an annular flange 97 which has longitudinal serrations 98 extending around the periphery thereof. Flange 97 is further provided with annular groove 99 which has a radial diameter less than the radial diameter of an arcuate plane passing through roots 100 of serrations 98. Rigidly secured to serrations 98 is a locking ring 101 having a flange 102 and external peripheral serrations 103. Ring 101 is further provided with truncated internal serrations 104 so as to provide inwardly extending projections 105. The width and radial depth of annular groove 99 are slightly greater than the height and radial length of projections 105, respectively. Locking ring 101 is shown in its inoperative or unlocked position prior to axial displacement thereof. In all respects, the embodiment of FIG. 17 is similar to that of the embodiment described in FIGS. 13–16.

Another embodiment of the invention is illustrated in FIG. 18 in which the fastener body (not shown) has a head 106 which is provided with longitudinal, external, peripheral serrations 107. Serrations 107 are provided with a radial web 108 positioned in the roots 109 of external serrations 107. A flange 110, having a plurality of external serrations 111 around the periphery thereof, is carried by locking ring 112. Locking ring 112 is further provided with internal serrations 113 which are engageable with serrations 107 of head 106. The internal periphery of the locking ring is provided with an annular groove or cavity 114 having a radial diameter less than the radial diameter of roots 115 of internal serrations 113 carried by locking ring 112. The width and radial depth of annular groove 114 are slightly greater than the thickness and radial length of web 108, respectively, so that the web is snugly accommodated in groove 114. Thus, the locking ring 112 is maintained in tight association with head 106 in a prealigned and predetermined position with respect to the fastener body and the counterbore 117 in workpiece 116 by virtue of the resilience of the material of the locking ring 112 coacting with the internested web 108 and annular groove 114. As illustrated, the locking ring in FIG. 18 is in its inoperative or unlocked position, having external serrations 111 thereof seated on the surface of workpiece 116 with a portion of the locking ring 112 accommodated within counterbore 117.

In FIG. 19, locking ring 112 of FIG. 18 is shown axially displaced into its operative or fully locked position. Upon the application of an axial force on the surface 118 of locking ring 112 groove 114 is disengaged from web 108. Simulataneously, the serrations 111 are embedded into the surface of workpiece 116. The workpiece material contained in the crevices between the serrations 111 will prevent rotational movement of the locking ring 112 with respect to the workpiece material. Since internal serrations 113 of locking ring 112 are also engaged with external serrations 107 of head 106 of the fastener body, the fastener body is also prevented from rotational movement with respect to the bore of workpiece 116.

FIG. 20 is an enlarged top plan view of the fastener head 106 taken on line 20—20 of FIG. 18 and clearly showing the root web 108 located in the roots 109 of head serrations 107. Web 108 is accommodated in annular groove 114 carried by locking ring 112 prior to the axial displacement of the locking ring into its locked position as illustrated in FIG. 19.

FIG. 21 is a sectional view of locking ring 112 taken on line 21—21 of FIG. 20 which clearly shows the relationship of the annular groove 114 to the internal serrations 113. As illustrated, the radial depth of the groove 114 is defined by wall 119 thereof (shown in dashed lines) and the radial diameter of the crest 120 of the internal serrations 113.

FIG. 22 is an illustration of a stud-type fastener embodying the principles of the invention illutsrated in FIGS. 20–21. The fastener body, generally designated by the numeral 121, is solid and is provided with threads 122 and an integral longitudinally extending shank 123 having threads 124 thereon. The body 121 is provided with an annular flange 125 which has longitudinal external serrations 126 around the periphery thereof. As was the case in the embodiment of FIGS 20–21, serrations 126 have a web 127 in the serration roots 128. Locking ring 129 has a flange 130 which is provided with external peripheral serrations 131. The locking ring is also provided with internal serrations 132 and an internal annular groove 133 which has a radial diameter less than the radial diameter of the roots 134 of internal serrations 132. The width and radial depth of annular groove 133 are slightly greater than the height and radial length of web 127, respectively.

As was the case in the embodiments of FIGS. 20–21, the resilience of the material of the locking ring 129, coacting with web 127 nested in annular groove 133, maintain the locking ring in tight association with flange 125 in a prealigned and predetermined position with respect to body 121 and the counterbore in the workpiece (not shown) in which the fastener would be threaded. As illustrated, the locking ring 129 is in an inoperative or unlocked position prior to axial displacement thereof into its locked or operative position.

While several embodiments of the invention and the method of making same have been described, it is, of course, understood that the particular embodiments of the invention herein disclosed are for illustrative purposes only and that various changes may be made therein, without departing from the principles of the invention or the scope of the annexed claims.

We claim:
1. A fastener comprising:
   a cylindrical body, said body being provided with a plurality of serrations on the outer periphery thereof;
   a locking ring, said locking ring provided with a plurality of serrations on the external periphery thereof and a plurality of internal serrations, said serrations being in axial slidable engagement with the serrations of said body, thereby providing preset alignment with said body;
   nesting means for securing said locking ring to said body comprised of projections carried by the internal serrations of the locking ring and corresponding cavities defined by horizontal webs in vertically spaced relationship disposed in the roots of the serrations carried by the body, said projections being positioned so as not to extend beyond the ends of said locking ring and having a longitudinal dimension less than the longitudinal dimension of said corresponding cavities, said projections extending inwardly and laterally relative to the axis of the locking ring.

2. A fastener as described in claim 1, wherein a substantial portion of each serration of the internal serrations of the locking ring is truncated, whereby a portion of the original configuration remains so that an inwardly extending projection is provided on each internal serration, said projection being interengaged with the cavities disposed in the roots of the external serrations of the fastener body so as to be in temporary rigidly secured alignment with the fastener body.

3. A fastener as described in claim 1, wherein a substantial portion of each serration of the internal serrations of the locking ring is truncated, whereby a portion of the original configuration remains, so that an inwardly extending projection is provided on each internal serration, said projection being interengaged with the with the cavities disposed in the roots of the external serrations of the fastener body so as to be in temporary rigidly secured alignment with the fastener body, and wherein the fastener body is tubular, the internal surface of said body being threaded and provided with a head portion which carries the serrations of the body.

4. A fastener as described in claim 1, wherein a substantial portion of each serration of the internal serrations of the locking ring is truncated, whereby a portion of the original configuration remains, so that an inwardly extending projection is provided on each internal serrations, said projection being interengaged with the cavities disposed in the roots of the external serrations of the fastener body so as to be in temporary rigidly secured alignment with the fastener body, and wherein the body is solid and is provided with an integral longitudinally extending threaded shank and a radial flange which carries the serrations of the body.

5. A fastener comprising:
   a cylindrical body, said body being provided with a plurality of serrations on the outer periphery thereof;
   a locking ring, said locking ring provided with a plurality of serrations on the external periphery thereof and a plurality of internal serrations, said serrations being in constant axial slidable engagement with the serrations of said body, thereby providing preset alignment with said body;
   nesting means for securing said locking ring to said body, said nesting means comprised of projections carried by the serrations of the body and an internal annular groove provided by the locking ring, said projections being positioned so as not to extend beyond the serrations of said body and having a longitudinal dimension less than the longitudinal dimension of said annular groove, said projections extending outwardly and laterally relative to the axis of the fastener body.

6. A fastener as described in claim 5, wherein a substantial portion of each serration of the external serrations of the body is truncated, whereby a portion of the original configuration remains, so that an outwardly extending projection carried by the body serrations is provided on each external serration, said projection being interengaged with the internal annular groove carried by the locking ring so that the locking ring is in temporary rigidly secured alignment with the fastener body.

7. A fastener comprising:
   a cylindrical body, said body being provided with a plurality of serrations on the outer periphery thereof;
   a locking ring, said locking ring provided with a plurality of serrations on the external periphery thereof and a plurality of internal serrations, said serrations being in constant axial slidable engagement with the serrations of said body, thereby providing preset alignment with said body;
   nesting means for securing said locking ring to said body, said nesting means comprised of projections carried by the internal serrations of the locking ring, and an external annular groove intersecting the body serrations, said projection being positioned so as not to extend beyond the ends of said locking ring and having a longitudinal dimension less than the longitudinal dimension of said annular groove, said projections extending inwardly and laterally relative to the axis of the locking ring.

8. A fastener as described in claim 7, wherein a substantial portion of each serration of the internal serrations of the locking ring is truncated, whereby a portion of the original configuration remains so that an inwardly extending projection is provided on each internal serration, said projections being interengaged with the annular groove which intersects the external serrations of the fastener body.

9. A fastener comprising:
   a cylindrical body, said body being provided with a plurality of serrations on the outer periphery thereof;
   a locking ring, said locking ring provided with a plurality of serrations on the external periphery thereof and a plurality of internal serrations, said serrations being in constant axial slidable engagement with the serrations of said body, thereby providing preset alignment with said body;
   nesting means for securing said locking ring to said body, said nesting means comprised of a horizontal web disposed in the roots of the serrations carried by the body and an internal annular groove provided by the locking ring, said web being interengaged with the internal annular groove carried by the locking ring so that the locking ring is in temporary rigidly secured alignment with the fastener body, said web being positioned so as not to extend beyond the serrations of said body and having a longitudinal dimension less than the longitudinal dimension of said annular groove, said web extending outwardly and laterally relative to the axis of the fastener body.

References Cited by the Examiner
UNITED STATES PATENTS

| | | | |
|---|---|---|---|
| 2,318,590 | 5/1943 | Boynton | 151—8 |
| 2,400,318 | 5/1946 | Rosan | 151—41.73 |
| 2,435,466 | 2/1948 | Thomas. | |
| 2,716,762 | 9/1955 | Stern | 10—155.5 |
| 2,730,732 | 1/1956 | Nielsen | 10—155.5 |
| 2,788,830 | 4/1957 | Rosan | 151—41.73 |
| 2,958,358 | 11/1960 | Neuschotz | 151—57 |
| 3,124,189 | 3/1964 | Dietlein | 151—41.73 |
| 3,130,765 | 4/1964 | Neuschotz | 151—23 |
| 3,179,144 | 4/1965 | Brown | 151—41.73 |

CARL W. TOMLIN, *Primary Examiner.*

M. PARSONS, JR., *Assistant Examiner.*